United States Patent
Mor et al.

(10) Patent No.: US 10,437,839 B2
(45) Date of Patent: Oct. 8, 2019

(54) BULK SETS FOR EXECUTING DATABASE QUERIES

(71) Applicant: HEWLETT PACKARD ENTERPRISE DEVELOPMENT LP, Houston, TX (US)

(72) Inventors: Avihay Mor, Yehud (IL); Eli Revach, Yehud (IL); Luba Tsirulnik, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 443 days.

(21) Appl. No.: 15/140,893

(22) Filed: Apr. 28, 2016

(65) Prior Publication Data

US 2017/0316003 A1    Nov. 2, 2017

(51) Int. Cl.
  *G06F 17/30*      (2006.01)
  *G06F 16/2457*    (2019.01)
  *G06F 16/2455*    (2019.01)
  *G06F 16/2453*    (2019.01)

(52) U.S. Cl.
  CPC .... *G06F 16/24578* (2019.01); *G06F 16/2453* (2019.01); *G06F 16/2455* (2019.01)

(58) Field of Classification Search
  CPC ......................................................... G06F 17/30
  USPC ........................................................ 707/706
  See application file for complete search history.

(56) References Cited

U.S. PATENT DOCUMENTS

| | | | |
|---|---|---|---|
| 8,131,718 B2 | 3/2012 | Tran | |
| 9,262,281 B2 | 2/2016 | Long et al. | |
| 9,720,709 B1* | 8/2017 | Stickle | G06F 8/71 |
| 9,749,355 B1* | 8/2017 | Benson | H04L 63/1441 |
| 2010/0030793 A1* | 2/2010 | Cooper | G06F 16/2282 707/602 |
| 2010/0114970 A1* | 5/2010 | Marin | G06F 16/951 707/802 |
| 2010/0306249 A1* | 12/2010 | Hill | G06Q 30/02 707/769 |
| 2015/0161686 A1* | 6/2015 | Williams | G06Q 30/0282 705/347 |
| 2016/0021173 A1 | 1/2016 | Tapia | |
| 2016/0140355 A1* | 5/2016 | Jagota | G06F 21/6218 707/785 |

(Continued)

OTHER PUBLICATIONS

Russom P., "Managing Big Data", < http://www.pentaho.com/sites/default/files/uploads/resources/tdwi_best_practices_report-_managing_big_data.pdf > (Web Page), 2013, 40 Pages.

(Continued)

*Primary Examiner* — Kim T Nguyen (57) ABSTRACT

A computer-implemented method includes determining a plurality of bulk sets for querying database records. The method also includes assigning a plurality of keysets to the plurality of bulk sets, with each keyset comprising a unique set of dimension attribute values from the database records. The method also includes calculating a predicted load score of each bulk set. The method also includes performing a transfer of a keyset from a first bulk set to a second bulk set when the transfer reduces a difference between predicted load scores of the first bulk set and the second bulk set. The method also includes, after the transfer, executing bulk queries using the plurality of bulk sets.

20 Claims, 7 Drawing Sheets

(56) References Cited

U.S. PATENT DOCUMENTS

2017/0316003 A1* 11/2017 Mor .................. G06F 16/24578

OTHER PUBLICATIONS

Slavakis K. et al., "Modeling and Optimization for Big Data Analytics", < https://www.dtc.umn.edu/s/resources/spincom8292.pdf > (Web Page), Aug. 19, 2014, 14 pages.

"Intelligent Data Management", Dell Storage Product Group, < http://computing.southern.edu/jbeckett/cpte433w16/TopicPapers/Storage/Dell_Intelligent_Data_Management.pdf > (Web Page), Jun. 2009, 8 pages.

* cited by examiner

BULK SETS FOR EXECUTING DATABASE QUERIES

BACKGROUND

A database includes a collection of data. The data included in a database may be stores and retrieved using a computer program such as a database management system (DBMS). One type of database is a relational database, which stores information in tables. A table is a series of intersecting rows and columns. The rows of a table may represent records, which are collections of information about particular items. The columns of a table may represent fields, which specify particular attributes of a record.

BRIEF DESCRIPTION OF THE DRAWINGS

Some implementations are described with respect to the following figures.

DETAILED DESCRIPTION

Databases can store large amounts of data related to a specific organization or activity. For example, a national retail company may use a database to store records related to each sale transaction completed by the company. In some examples, it may be desirable to perform an analysis of a large set of records. For example, a database manager may process all records created in a given day, and may generate baseline information characterizing those records (e.g., average/mean, standard deviation, slope/trend, and so forth). Such baseline information may be compared across time periods, and may be used to identify unusual events or trends in the database records. When analyzing the database, the records may be fetched from the database sequentially (i.e., one at a time) or using bulk processing. In bulk processing, a series of queries may be used to fetch records in batches. However, it may be difficult to predict the processing load associated with each batch. As such, the work load and memory usage of a database system may be unevenly distributed when processing different batches.

In accordance with some implementations, examples are provided for bulk processing of database records. As described further below, some implementations may include determining a number of bulk sets for querying a database. Each bulk set may include multiple keysets, with each keyset including a unique combination of dimension attribute values. A load score may be calculated for each bulk set based on the keysets. The keysets may be transferred between bulk sets to reduce a total difference of load scores of the bulk sets. The bulk sets may be used to execute bulk queries. Accordingly, some implementations may provide an amount of uniformity in the load impacts of the bulk queries, which may result in increased efficiency in data record retrieval and reduced memory footprints.

Figure 1:
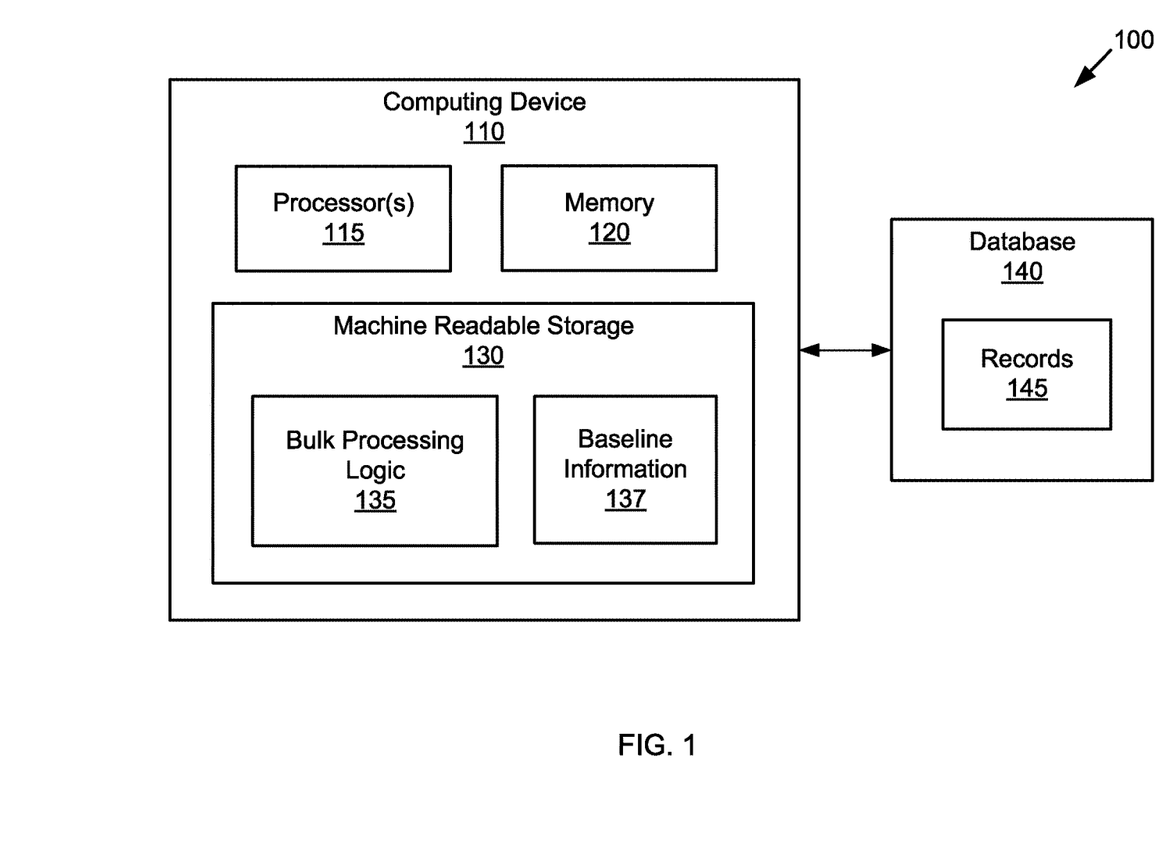
FIG. 1 is a schematic diagram of an example system, in accordance with some implementations.

FIG. 1 shows a schematic diagram of an example system 100, in accordance with some implementations. As shown, in some implementations, the system 100 may include a computing device 110 and a database 140. The computing device 100 may be, for example, a computer, a portable device, a server, a network client, a communication device, etc. Further, the computing device 110 may be any grouping of related or interconnected devices, such as a blade server, a computing cluster, and the like. Furthermore, in some implementations, the computing device 110 may be a dedicated appliance or device for interacting with the database 140.

As shown, the computing device 110 can include processor(s) 115, memory 120, and machine-readable storage 130. The processor(s) 115 can include a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 can include bulk processing logic 135 and baseline information 137. The bulk processing logic 135 may include any instructions (e.g. software application(s)) that execute on the processor(s) 110.

As shown in FIG. 1, the database 140 can store data records 145. For example, the database 140 may be a relational database, an object database, an extensible markup language (XML) database, a flat file, a data warehouse, and so forth. In some implementations, the data records 145 may include measure attributes and dimension attributes. As used herein, the term "measure attribute" refers to an attribute of a record (e.g., a column) that includes data of interest in a given query or operation. Further, the term "dimension attribute" refers to an attribute that describes or characterizes one or more measure attributes, and that may be used to aggregate values of the measure attributes. For example, in a sales database of a retail company, a "sales amount" column may be a measure attribute, and "sales date" and "sales location" columns may be dimension attributes. Thus, in this example, aggregating the measure attribute using the dimension attributes may provide the daily sales totals for each store location.

In some implementations, the baseline information 137 may summarize and/or describe characteristics of a large group of data records 145. For example, the baseline information 137 may include statistical information of the data records 145, such as mean, standard deviation, frequency of occurrence, and so forth. Further the baseline information 137 may include trend information of the data records 145, such as curve fit, slope, and so forth. In some examples, the baseline information 137 may be generated using the bulk processing logic 135.

In some implementations, the bulk processing logic 135 may provide execution of queries using bulk sets. As used herein, the term "bulk set" refers to a group of keysets that are included in a single bulk query. The term "keyset" refers to a unique combination of dimension attribute values that describe a set of records. The term "bulk queries" refers to a group of queries that each retrieve a different data portion, and that together may retrieve a combined data set used for a bulk operation. The term "bulk operation" refers to a data operation that is performed using data retrieved by multiple bulk queries. Example implementations of the bulk processing logic 135 are described further below with reference to FIGS. 2-6.

Note that, while FIG. 1 shows an example implementation, other implementations are possible. For example, it is contemplated that the database 140 may be included in the computing device 110. In another example, it is contemplated that the baseline information 137 may be included in the database 140. Any of the features described above with reference to FIG. 1 may combined and/or used with any other features described herein. Other combinations and/or variations are also possible.

Figure 2:
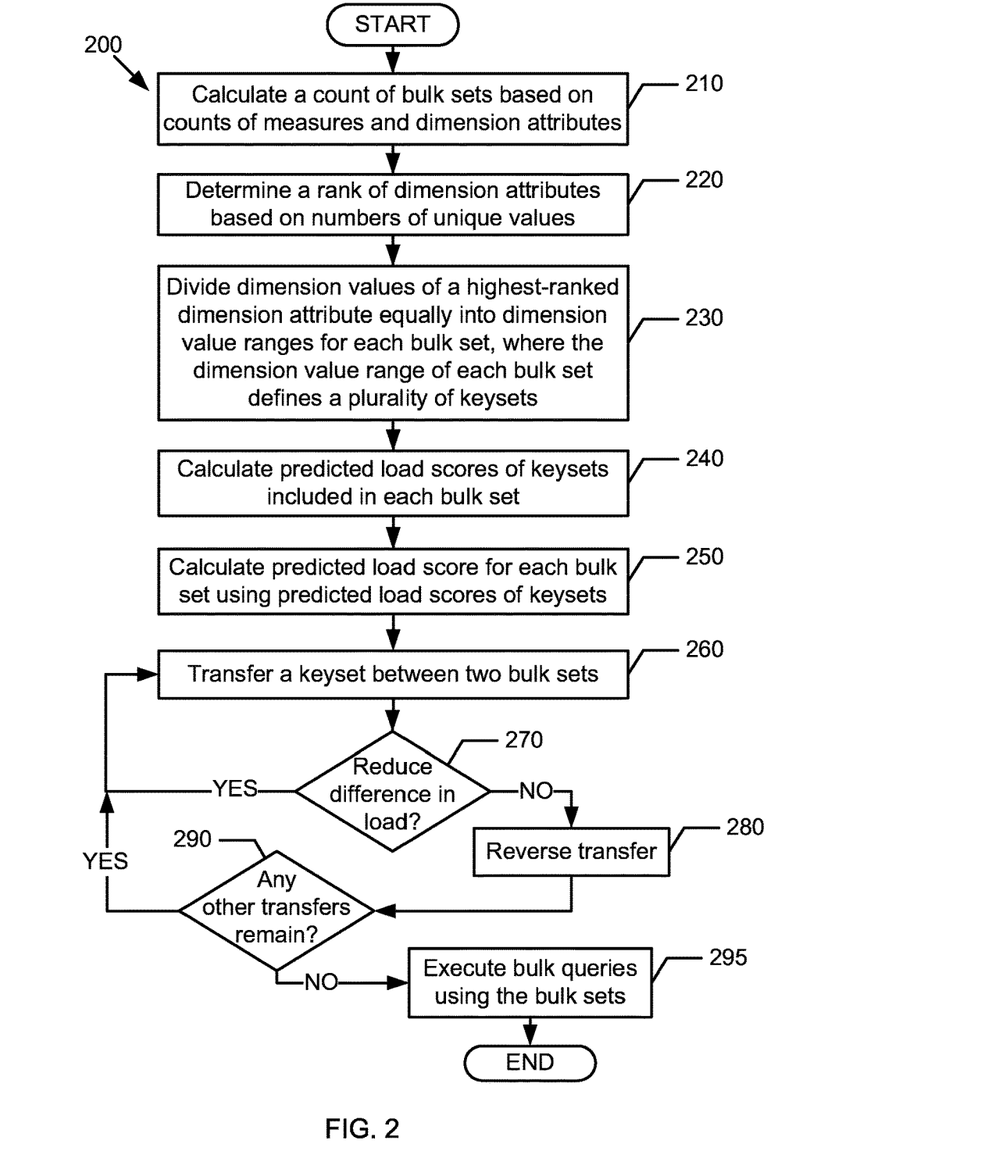
FIG. 2 is a flow diagram of an example process, in accordance with some implementations.

Referring now to FIG. 2, shown is a process 200 for executing queries using bulk sets, in accordance with some implementations. The process 200 may be performed by the processor(s) 110 and/or the bulk processing logic 135 shown in FIG. 1. For the sake of illustration, details of the process 200 may be described below with reference to FIGS. 1 and 3A-3D, which show examples in accordance with some implementations. However, other implementations are also possible.

Figure 3A:
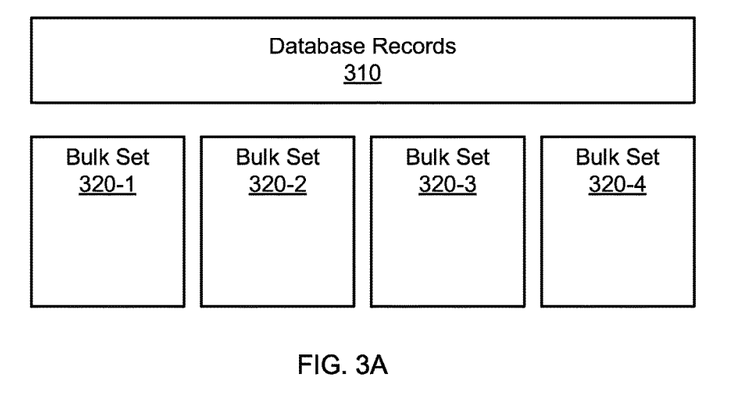
FIGS. 3A-3D are schematic diagrams of example data structures, in accordance with some implementations.

At block 210, a count of bulk sets may be calculated based on counts of measure attributes and dimension attributes. For example, referring to FIG. 1, the bulk processing logic 135 may multiply the number of measure attributes and the number of dimension attributes to calculate the total number of keysets included in a given bulk operation. The bulk processing logic 135 may calculate the count of bulk sets as equal to the total number of keysets divided by the keyset capacity of each bulk set. The keyset capacity of each bulk set may be, for example, a configuration setting (e.g., a stored user-specified value). By way of illustration, FIG. 3A shows an example in which a bulk operation for the database records 310 is determined to require four bulk sets 320-1, 320-2, 320-3, and 320-4.

At block 220, a rank of dimension attributes may be determined based on numbers of unique values. For example, referring to FIG. 1, the bulk processing logic 135 may determine that the dimension attribute "product" includes more distinct values that the dimension attribute "location," and may thus determine that the dimension attribute "product" has a higher rank than the dimension attribute "location." Thus, the bulk processing logic 135 may determine a rank of dimension attributes as an ordered list of dimension attributes applicable to the bulk operation, with dimension attributes with a higher number of distinct values being ordered (e.g., ranked) higher in the ordered list. Further, the bulk processing logic 135 may identify a first dimension attribute having a larger amount of distinct values than other dimension attributes as the highest ranked dimension attribute.

Figure 3B:
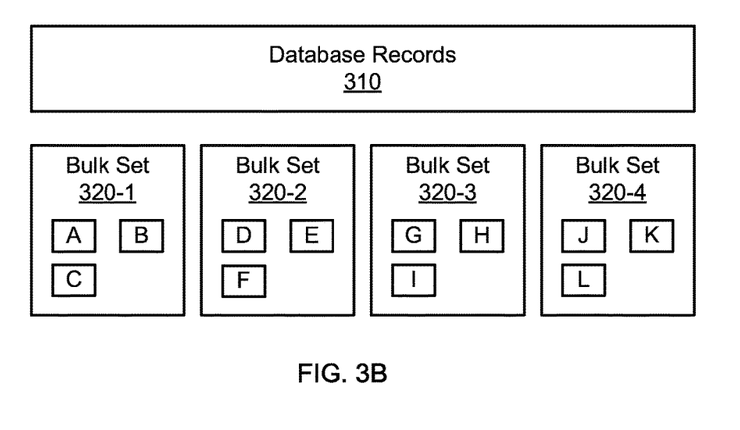

At block 230, dimension values of a highest-ranked dimension attribute may be divided equally into dimension value ranges for each bulk set, where the dimension value range of each bulk set defines a plurality of keysets. For example, referring to FIG. 1, the bulk processing logic 135 may divide the highest-ranked dimension attribute (e.g., "product") into equal dimension value ranges corresponding to the bulk sets. In a particular bulk set, each dimension value included in the dimension value range may define an individual keyset included in that bulk set. For example, referring to FIG. 3B, assume that the highest-ranked dimension attribute has twelve possible dimension values. Assume also that the twelve dimension values define the twelve keysets A-L. Thus, in the example of FIG. 3B, the twelve possible dimension values are evenly divided into four ranges of three dimension values each, where each range is assigned to one of the four bulk sets 320-1, 320-2, 320-3, and 320-4. By way of illustration, the four bulk sets 320-1, 320-2, 320-3, and 320-4 are shown in FIG. 3B as each including three keysets (e.g., keysets A, B, C), as defined by the three dimension values assigned to each bulk set. That is, each of the keysets A-L is defined by dimension values included in a different dimension value range of the highest-ranked dimension attribute (e.g., "product"). Note that, while the above example describes the keysets A-L as defined by values of a single dimension attribute, other implementations are possible. For example, each keyset may be defined by a combination of values from multiple dimension attributes (e.g., a "product" value, a "location" value, and a "date" value).

At block 240, the predicted load scores of keysets included in each bulk set may be calculated. For example, referring to FIGS. 1 and 3B, the bulk processing logic 135 may predict load scores for each of the keysets A-L. As used herein, the term "load score" refers to a value indicative of resource consumption attributable to processing a particular keyset or bulk set. In some implementations, the predicted load score of a keyset may be determined using historical information or baseline information for that keyset. For example, the historical information or baseline information may indicate that previous queries including a given keyset have on average returned a given number of records (e.g., a thousand records). Based on this information, the bulk processing logic 135 may predict that the same keyset will cause a current query to return the same number of records. Note that, while this example describes a predicted load score in terms of number of records, other implementations are possible. For example, the predicted load score may reflect processing time, memory usage, drive access time, data transfer time/capacity, and so forth.

At block 250, the predicted load score for each bulk set may be calculated using the predicted load scores of keysets. For example, referring to FIGS. 1 and 3B, the bulk processing logic 135 may calculate the predicted load score for bulk set 320-1 by summing the predicted load scores of keysets A, B, and C (included in bulk set 320-1).

Figure 3C:
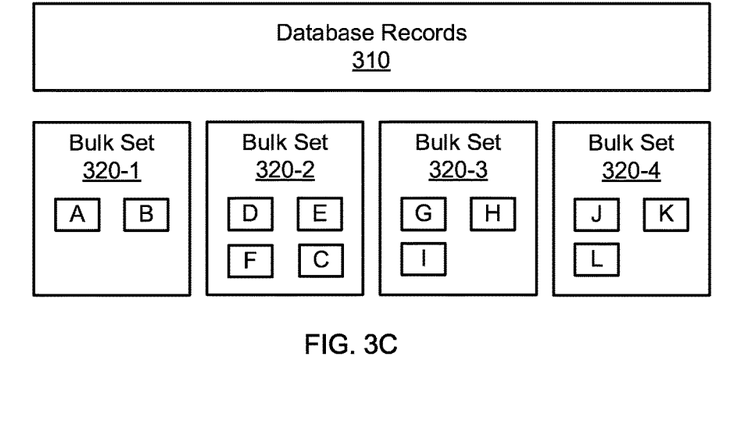

At block 260, a keyset may be transferred between two bulk sets. In some implementations, keyset transfers may be performed in multiple iterations, with each keyset transfer being a separate iteration. For example, FIG. 3C shows a first iteration in which the keyset C is transferred from the bulk set 320-1 to the bulk set 320-2.

At block 270, a determination is made about whether the keyset transfer (performed at block 260) reduces a difference in predicted load scores between the bulk sets. For example, referring to FIGS. 1 and 3C, the bulk processing logic 135 may determine whether the transfer of the keyset C reduces a difference between the predicted load scores of the bulk sets 320-1 and 320-2.

Figure 3D:
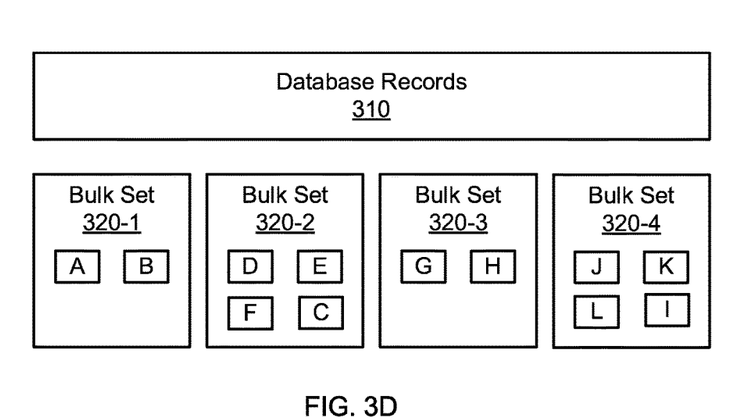

If it is determined at block 270 that the transfer keyset reduces a difference in predicted load scores, then the process 200 returns to block 260 for another iteration of a keyset transfer. For example, FIG. 3D shows a second iteration in which the keyset I is transferred from the bulk set 320-3 to the bulk set 320-4. However, if it is determined at block 270 that the keyset transfer does not reduce a difference in predicted load scores, then at block 280, the keyset transfer is reversed. For example, referring to FIGS. 3B and 3C, the keyset C may be transferred from the bulk set 320-2 back to the bulk set 320-2. In some implementations, the determination as to whether the difference in load scores is reduced may be based on a minimum difference setting. For example, the bulk processing logic 135 may determine that the difference between predicted load scores is not reduced if the difference does not exceed a specified minimum difference value.

At block 290, a determination is made about whether there are any other keyset transfers remaining. For example, referring to FIG. 1, the bulk processing logic 135 may determine whether there are keyset transfers that have not been previously attempted. If it is determined at block 290 that there are other keyset transfers remaining that have not been previously attempted, then the process 200 returns to block 260 for another iteration of a keyset transfer.

However, if it is determined at block 290 that there are no other keyset transfers remaining, then the iterations of keyset transfers are ended. At block 295, the bulk queries may be executed using the bulk sets. For example, referring to FIG. 3D, four bulk queries may be executed using the bulk sets 320-1, 320-2, 320-3, and 320-4 (including the transferred keysets C and I). In some implementations, each bulk query may be executed as part of a bulk operation to generate baseline information for a database (e.g., database 140 shown in FIG. 1). After block 295, the process 200 is completed.

Figure 4:
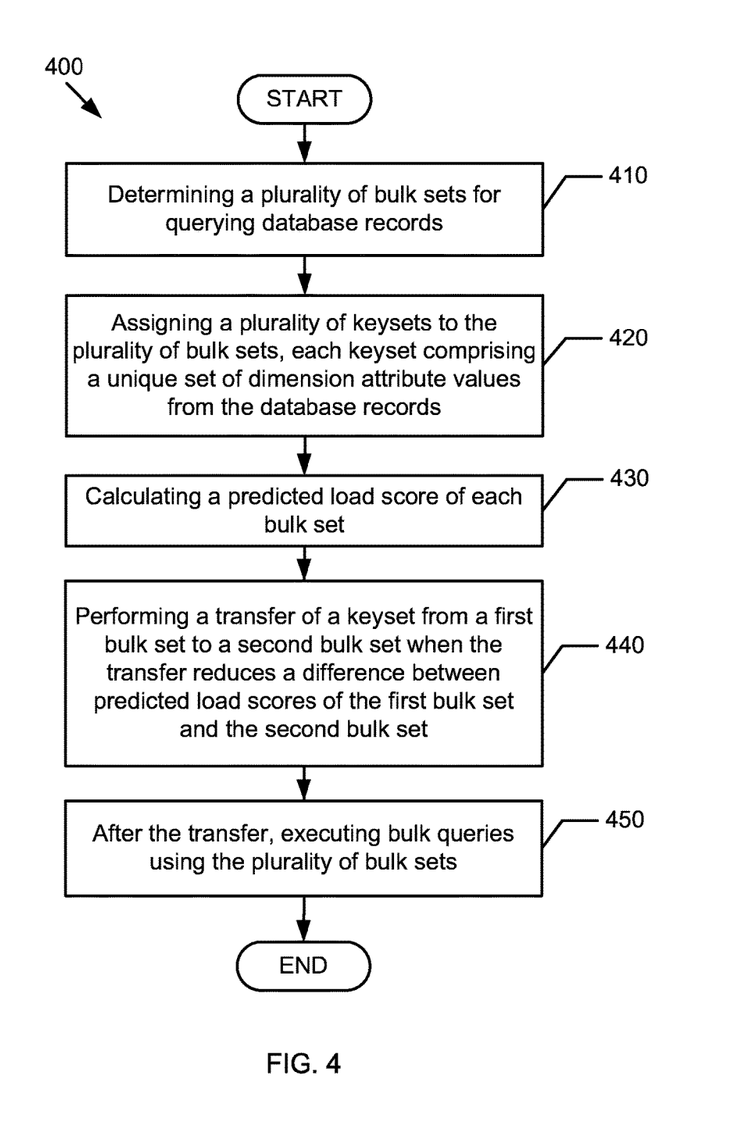
FIG. 4 is a flow diagram of an example process in accordance with some implementations.

Referring now to FIG. 4, shown is a process 400 for executing queries using bulk sets, in accordance with some implementations. The process 400 may be performed by the processor(s) 110 and/or the bulk processing logic 135 shown in FIG. 1. For the sake of illustration, details of the process 400 may be described below with reference to FIGS. 1 and 3A-3D, which show examples in accordance with some implementations. However, other implementations are also possible.

At block 410, a plurality of bulk sets may be determined for querying database records. For example, referring to FIG. 1, the bulk processing logic 135 may calculate a number of bulk sets based on a number of measure attributes, a number of dimension attributes, and a keyset capacity of each bulk set.

At block 420, a plurality of keysets may be assigned to the plurality of bulk sets, with each keyset comprising a unique set of dimension attribute values from the database records. In some implementations, the keysets assigned to a bulk set may be defined by a dimension value range assigned to the bulk set. For example, referring to FIG. 1, the bulk processing logic 135 may identify a first dimension attribute having a larger amount of distinct values than other dimension attributes. Further, the bulk processing logic 135 may assign, to each of the plurality of bulk sets, a unique range of values in the first dimension attribute. Each value included in the assigned range may define a particular keyset. For example, referring to FIG. 3B, the keysets A-L have been variously allocated to bulk sets 320-1, 320-2, 320-3, and 320-4. Each of the keysets A-L may be defined by the dimension values assigned to each of the bulk sets 320-1, 320-2, 320-3, and 320-4.

At block 430, the predicted load scores of each bulk set may be calculated. In some implementations, the predicted load scores of a bulk set may be equal to a sum of the predicted load scores of each keyset included in that bulk set. For example, referring to FIGS. 1 and 3B, the bulk processing logic 135 may predict a load score for bulk set 320-2 by summing the predicted load scores of keysets D, E, and F (included in bulk set 320-2).

At block 440, a transfer of a keyset from a first bulk set to a second bulk set may be performed when the transfer reduces a difference between predicted load scores of the first bulk set and the second bulk set. For example, referring to FIGS. 1 and 3C, the bulk processing logic 135 may determine whether the transfer of keyset C reduces a difference between the predicted load scores of the bulk sets 320-1 and 320-2. If so, the transfer of keyset C remains unchanged. However, if the bulk processing logic 135 determines that the transfer of keyset C does not reduce the difference between the predicted load scores, the transfer of keyset C is reversed.

At block 450, after the transfer, bulk queries may be executed using the plurality of bulk sets. For example, referring to FIG. 3D, four bulk queries may be executed using the bulk sets 320-1, 320-2, 320-3, and 320-4. After block 450, the process 400 is completed.

Figure 5:
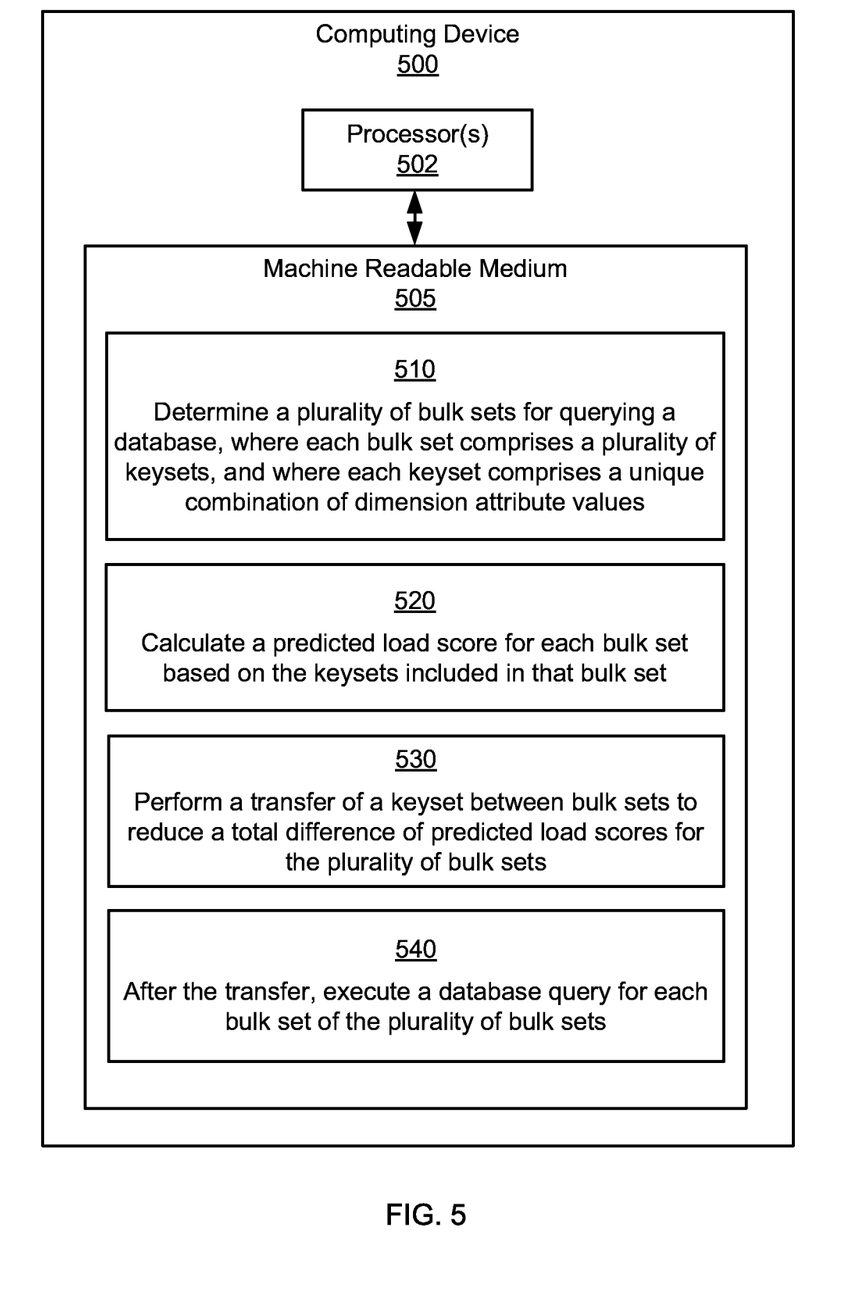
FIG. 5 is a schematic diagram of an example computing device, in accordance with some implementations.

Referring now to FIG. 5, shown is a schematic diagram of an example computing device 500. As shown, the computing device 500 can include a hardware processor(s) 502 and machine-readable storage medium 505. The machine-readable storage medium 505 may store instructions 510-540. The instructions 510-540 can be executed by the hardware processor(s) 502. The instructions 510-540 may form part of bulk processing logic 135 shown in FIG. 1.

The hardware processor(s) 502 can include microprocessors, microcontrollers, processor modules or subsystems, programmable integrated circuits, programmable gate arrays, multiple processors, microprocessors including multiple processing cores, or another control or computing devices. The memory machine-readable storage medium 505 can include non-transitory storage media such as hard drives, flash storage, optical disks, etc.

Instruction 510 may determine a plurality of bulk sets for querying a database, where each bulk set comprises a plurality of keysets, and where each keyset comprises a unique combination of dimension attribute values. For example, referring to FIG. 1, the bulk processing logic 135 may calculate a number of bulk sets based on a number of measure attributes, a number of dimension attributes, and a keyset capacity of each bulk set. Further, in some examples, the bulk processing logic 135 may identify, from a plurality of dimension attributes, a first dimension attribute having a largest number of unique values. Furthermore, the bulk processing logic 135 may assign, to each of the plurality of bulk sets, a unique range of values in the first dimension attribute. Each value included in the assigned range may define a particular keyset. For example, referring to FIG. 3B, the bulk sets 320-1, 320-2, 320-3, and 320-4 may include the keysets A-L.

Instruction 520 may calculate a predicted load score for each bulk set based on the keysets included in that bulk set. For example, referring to FIGS. 1 and 3B, the bulk processing logic 135 may predict a load score for bulk set 320-3 by summing the predicted load scores of keysets G, H, and I (included in bulk set 320-3).

Instruction 530 may perform a transfer of a keyset between bulk sets to reduce a total difference of predicted load scores for the plurality of bulk sets. For example, referring to FIGS. 1 and 3C, the keyset C may be transferred from bulk set 320-1 to bulk set 320-2. The bulk processing logic 135 may determine whether the transfer of keyset C reduces a difference between the predicted load scores of the bulk sets 320-1 and 320-2. If not, the bulk processing logic 135 may reverse the transfer of keyset C. In some examples, the bulk processing logic 135 may perform multiple iterations to transfer keysets between bulk sets, and may terminate the iterations when there is no remaining transfer that reduces differences between predicted load scores of the plurality of bulk sets.

Instruction 540 may, after the transfer, execute a database query for each bulk set of the plurality of bulk sets. For example, referring to FIG. 3D, four bulk queries may be executed using the bulk sets 320-1, 320-2, 320-3, and 320-4.

Figure 6:
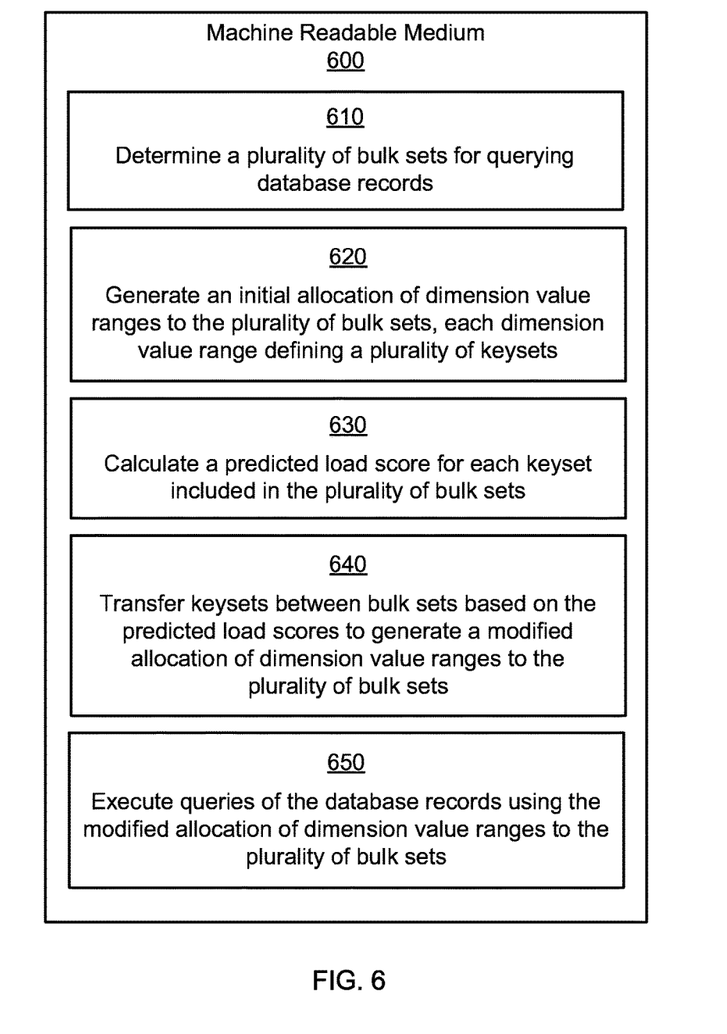
FIG. 6 is a diagram of an example machine-readable storage medium storing instructions in accordance with some implementations.

Referring now to FIG. 6, shown is a machine-readable storage medium 600 storing instructions 610-640, in accordance with some implementations. The instructions 610-640 can be executed by any number of processors (e.g., processor(s) 502 shown in FIG. 5). The instructions 610-640 may form part of the bulk processing logic 135 shown in FIG. 1. The memory machine-readable storage medium 600 can include non-transitory storage media such as hard drives, flash storage, optical disks, etc.

Instruction 610 may determine a plurality of bulk sets for querying database records. For example, referring to FIG. 1, the bulk processing logic 135 may calculate a number of bulk based on a number of measure attributes, a number of dimension attributes, and a keyset capacity of each bulk set.

Instruction 620 may generate an initial allocation of dimension value ranges to the plurality of bulk sets, with each dimension value range defining a plurality of keysets. For example, referring to FIG. 1, the bulk processing logic 135 may divide a dimension attribute with a largest number of values (e.g., "product") into dimension value ranges corresponding to the bulk sets. Each dimension value range may be associated with a group of keysets. For example, referring to FIG. 3B, keysets A-L are allocated across the bulk sets 320-1, 320-2, 320-3, and 320-4.

Instruction 630 may calculate a predicted load score for each keyset included in the plurality of bulk sets. For example, referring to FIGS. 1 and 3B, the bulk processing logic 135 may predict a load score for each of the keysets A-L.

Instruction 640 may transfer keysets between bulk sets based on the predicted load scores to generate a modified allocation of dimension value ranges to the plurality of bulk sets. For example, referring to FIG. 3C, the keyset C may be transferred from bulk set 320-1 to bulk set 320-2, thus modifying the allocation of dimension value ranges among the bulk sets 320-1 and 320-3. In another example, referring to FIG. 3D, the keyset H may be transferred from bulk set 320-3 to bulk set 320-4. In some implementations, a keyset transfer may be completed only if that keyset transfer reduces a total difference of predicted load scores for the plurality of bulk sets. Further, in some examples, the bulk processing logic 135 may perform a series of transfers of keysets between bulk sets, where the series of transfers ends when no remaining transfer reduces differences between load scores of the bulk sets.

Instruction 650 may execute queries of the database records using the modified allocation of dimension value ranges to the plurality of bulk sets. For example, referring to FIG. 3D, four bulk queries may be executed using the bulk sets 320-1, 320-2, 320-3, and 320-4 (including the transferred keysets C and H).

As discussed above, performing bulk queries can result in unevenly distributed load impacts. In accordance with some implementations, examples are provided for processing bulk queries. Some implementations include determining a number of bulk sets for querying a database. Each bulk set can include multiple keysets, with each keyset including a unique combination of dimension attribute values. The keysets may be transferred between bulk sets to reduce a total difference of load scores of the bulk sets. Some implementations may provide an amount of uniformity in the load impacts of the bulk queries.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer-implemented method comprising:
   determining a plurality of bulk sets for querying database records;
   assigning a plurality of keysets to the plurality of bulk sets, each keyset comprising a unique set of dimension attribute values from the database records;
   calculating a predicted load score of each bulk set;
   performing a transfer of a keyset from a first bulk set to a second bulk set when the transfer reduces a difference between predicted load scores of the first bulk set and the second bulk set; and
   after the transfer, executing bulk queries using the plurality of bulk sets.

2. The computer-implemented method of claim 1, wherein executing the bulk queries generates baseline information that summarizes characteristics of the database records.

3. The computer-implemented method of claim 1, further comprising:
   calculating a count of the plurality of bulk sets based on a count of measure attributes and a count of dimension attributes.

4. The computer-implemented method of claim 1, further comprising:
   identifying a first dimension attribute having a larger amount of distinct values than other dimension attributes; and
   assigning, to each of the plurality of bulk sets, a unique range of values in the first dimension attribute.

5. The computer-implemented method of claim 1, comprising calculating the predicted load score of each bulk set as a sum of predicted load scores of keysets included in that bulk set.

6. The computer-implemented method of claim 5, wherein the predicted load scores of the keysets are based on historical information associated with the keysets.

7. A computing device comprising:
a hardware processor; and
a machine-readable storage medium storing instructions, the instructions executable by the hardware processor to:
determine a plurality of bulk sets for querying a database, wherein each bulk set comprises a plurality of keysets, wherein each keyset comprises a unique combination of dimension attribute values;
calculate a predicted load score for each bulk set based on the keysets included in that bulk set;
perform a transfer of a keyset between bulk sets to reduce a total difference of predicted load scores for the plurality of bulk sets; and
after the transfer, execute a bulk query for each bulk set of the plurality of bulk sets.

8. The computing device of claim 7, the instructions further executable to:
calculate the predicted load score for each bulk set by summing predicted load scores of the keysets included in that bulk set.

9. The computing device of claim 8, wherein the predicted load scores of the keysets are based on baseline information summarizing historical characteristics of the keysets.

10. The computing device of claim 7, the instructions further executable to:
identify, from a plurality of dimension attributes, a first dimension attribute having a largest number of unique values; and
assign, to each of the plurality of bulk sets, a unique range of values in the first dimension attribute.

11. The computing device of claim 7, the instructions further executable to, prior to executing the database queries:
perform iterations to transfer keysets between bulk sets; and
terminate the iterations when there is no remaining transfer that reduces differences between predicted load scores of the plurality of bulk sets.

12. An article comprising a non-transitory machine-readable storage medium storing instructions that upon execution cause a processor to:
determine a plurality of bulk sets for querying database records;
generate an initial allocation of dimension value ranges to the plurality of bulk sets, each dimension value range including a plurality of keysets;
calculate a predicted load score for each keyset included in the plurality of bulk sets;
transfer keysets between bulk sets based on the predicted load scores to generate a modified allocation of dimension value ranges to the plurality of bulk sets; and
execute a plurality of bulk queries of the database records using the modified allocation of dimension value ranges to the plurality of bulk sets.

13. The article of claim 12, the instructions further executable to:
determine a rank of dimension attributes based on numbers of unique values; and
divide dimension values of a highest-ranked dimension attribute into the dimension value ranges.

14. The article of claim 12, the instructions further executable to:
generate, using results of the executed bulk queries, baseline information that summarizes characteristics of the database records.

15. The article of claim 12, the instructions further executable to:
prior to executing the plurality of bulk queries, perform a series of transfers of keysets between bulk sets, wherein the series of transfers ends when no remaining transfer reduces differences between load scores of the bulk sets.

16. The article of claim 14, wherein the generated baseline information includes statistical information of the database records.

17. The article of claim 14, wherein the generated baseline information includes trend information of the database records.

18. The computer-implemented method of claim 2, wherein the generated baseline information includes statistical information of the database records.

19. The computer-implemented method of claim 2, wherein the generated baseline information includes trend information of the database records.

20. The computing device of claim 7, wherein executing bulk queries for the plurality of bulk sets generates baseline information that summarizes characteristics of the database records, wherein the generated baseline information includes statistical or trend information of the database records.

* * * * *